(12) United States Patent
Arshad

(10) Patent No.: US 10,739,819 B2
(45) Date of Patent: Aug. 11, 2020

(54) WEARABLE SMART DEVICE

(71) Applicant: Affan Arshad, Elk Grove, CA (US)

(72) Inventor: Affan Arshad, Elk Grove, CA (US)

( * ) Notice: Subject to any disclaimer, the term of this patent is extended or adjusted under 35 U.S.C. 154(b) by 0 days.

(21) Appl. No.: 16/663,165

(22) Filed: Oct. 24, 2019

(65) Prior Publication Data

US 2020/0133333 A1 Apr. 30, 2020

Related U.S. Application Data

(63) Continuation-in-part of application No. PCT/IB2019/059155, filed on Oct. 24, 2019.

(60) Provisional application No. 62/750,104, filed on Oct. 24, 2018.

(51) Int. Cl.
| | |
|---|---|
| G06F 1/16 | (2006.01) |
| G06F 3/14 | (2006.01) |
| G06F 3/041 | (2006.01) |
| H04N 5/247 | (2006.01) |
| H04N 5/225 | (2006.01) |

(52) U.S. Cl.
CPC ............ *G06F 1/163* (2013.01); *G06F 1/1616* (2013.01); *G06F 1/1652* (2013.01); *G06F 3/041* (2013.01); *G06F 3/1423* (2013.01); *H04N 5/2253* (2013.01); *H04N 5/247* (2013.01); *G06F 1/1635* (2013.01); *G06F 1/1686* (2013.01); *G06F 1/1688* (2013.01); *G06F 1/1698* (2013.01)

(58) Field of Classification Search
CPC ...... G06F 1/163; G06F 1/1616; G06F 1/1635; G06F 1/1652; G06F 1/1686; G06F 1/1688; G06F 1/1698; G06F 3/041; G06F 3/1423; G04G 17/06; G04G 17/08; A44C 5/0007; A44C 5/00; H04N 5/247; H04N 5/2253

See application file for complete search history.

(56) References Cited

U.S. PATENT DOCUMENTS

| | | | |
|---|---|---|---|
| D721,701 S * | 1/2015 | Al-Nasser | ................... D14/344 |
| 2004/0156270 A1* | 8/2004 | Weng | ..................... G04C 19/00 368/82 |
| 2006/0209218 A1* | 9/2006 | Lee | .......................... G04G 9/00 349/1 |
| 2012/0080462 A1* | 4/2012 | Hajarian | ................... A45F 5/00 224/219 |
| 2015/0124566 A1* | 5/2015 | Lake | ...................... G04G 21/08 368/10 |

(Continued)

*Primary Examiner* — Abhishek M Rathod

(57) ABSTRACT

A wearable smart device is configured to provide wireless and cellular data access through position- and orientation-adjustable touchscreens, which may be flexible or rigid and may be of a variety of different screen compositions. The device includes a wristband, a primary touchscreen, a secondary touchscreen, a swiveling mechanism, a first ratcheting mechanism, and a controller. The wristband enables a user to connect the present invention to the user's body, especially around the user's wrist. The primary touchscreen provides the user with the ability to interact with the device through touch. The secondary touchscreen also allows the user to further interact with the device. The swiveling mechanism enables the primary touchscreen to rotate upon the wristband. The first ratcheting mechanism enables adjustment of the secondary touchscreen relative to the primary touchscreen. The controller accepts electrical inputs and returns electrical output signals. A portable power supply is positioned offset from the controller.

23 Claims, 9 Drawing Sheets

(56) References Cited

U.S. PATENT DOCUMENTS

| | | | |
|---|---|---|---|
| 2016/0070296 A1* | 3/2016 | Koo | G06F 1/163 |
| | | | 361/679.03 |
| 2016/0070367 A1* | 3/2016 | Lin | G06F 3/0383 |
| | | | 345/158 |
| 2016/0127624 A1* | 5/2016 | Woo | G02B 27/017 |
| | | | 348/36 |
| 2016/0259430 A1* | 9/2016 | Hong | G09G 5/003 |
| 2016/0357158 A1* | 12/2016 | Kim | G06F 1/163 |
| 2017/0000222 A1* | 1/2017 | Lee | A44C 5/147 |
| 2017/0139442 A1* | 5/2017 | Yoshizumi | H04M 1/0268 |
| 2017/0186132 A1* | 6/2017 | Lee | G06F 3/04883 |
| 2018/0064395 A1* | 3/2018 | Shim | A61B 5/0004 |
| 2018/0120901 A1* | 5/2018 | Jin | G06F 1/1649 |
| 2018/0210491 A1* | 7/2018 | Song | G04G 17/06 |

\* cited by examiner

WEARABLE SMART DEVICE

The current application claims a priority to the U.S. Provisional Patent application Ser. No. 62/750,104 filed on Oct. 24, 2018.

FIELD OF THE INVENTION

The present invention generally relates to a smart device. More specifically, the wearable smart device relates to a watch with one or several touchscreen displays that can be adjustably oriented to improve comfort during use and adjust functionality.

BACKGROUND OF THE INVENTION

Electronic devices have become an essential part of many people's lives. From smart phones to tablets and laptops, almost everyone carries an electronic device with them. Smart phones especially have grown in popularity over the last decade thanks to the various functionalities smart phones provide. In addition, with the continuing advances in technology, the shape and size of smart phones have been decreasing, allowing for better and more comfortable transportation and use. For example, while old phones were bulky and were not easily carried on a pocket, newer smart phones are slim, which enables users to carry and use the smart phones more comfortably. Currently, there has been a growing interest of providing smart phones or mobile computing devices as wearable devices. Many wearable devices are currently available, such as smart watches. However, the currently available wearable devices provide limited functionality due to the size restriction these devices have. Many of the currently available wearable devices are only able to provide data transmitted from a main device due to being unable to carry out the processes that the main device can. For example, many smart watches are mostly able to operate as long as the smart watches are connected to a smart phone. Thus, the functionality of many wearable devices is dependent on the connection to a main device. Some wearable smart phone devices have been disclosed which try to provide a smart phone which can be carried on the body of a user. However, these wearable smart phone devices are not practical to be used while the users wear these devices on the body. Thus, there is a need for a wearable smart phone which eliminates the shortcomings of previous wearable computing devices.

An objective of the present invention is to provide a wearable smart phone. The wearable smart phone comprises a structure designed to be worn on the body of the user, preferably around the wrist. The wearable smart phone comprises a flexible display with a bendable structure which can be rotated. The display of the wearable smart phone can comprise a single structure divided into multiple sections provided along the structure of the attachment mechanism of the wearable smart phone. However, the display can also comprise separate sections with the capability to be joined together to form a single display utilizing an automatic or semi-automatic system and mechanism. In the preferred embodiment of the present invention, the wearable smart phone comprises a plurality of features which are adapted to be optimize the functionality of the wearable smart phone while the wearable smart phone is worn on the body of the users. The wearable smart phone further comprises a plurality of sensors including, but not limited to, biometric sensors, environment sensors, etc. The wearable smart phone can comprise a plurality of batteries which can be integrated on various locations of the structure of the wearable smart phone. Further, a plurality of batteries can further be provided as removable batteries for additional power to the wearable smart phone. The wearable smart phone can comprise various storage and communication technologies which allows data to be stored and/or transmitted to/from the wearable smart phone to an external device. Furthermore, the wearable smart phone also has a plurality of sensors including, but not limited to, temperature, light, and humidity sensors so the wearable smart phone can monitor the users' health changes related to the external temperature, light, and humidity changes. Light can be from any kind of light source (e.g. sunlight, artificial light, UV light, etc.).

DETAILED DESCRIPTION OF THE INVENTION

All illustrations of the drawings are for the purpose of describing selected versions of the present invention and are not intended to limit the scope of the present invention.

Figure 1:
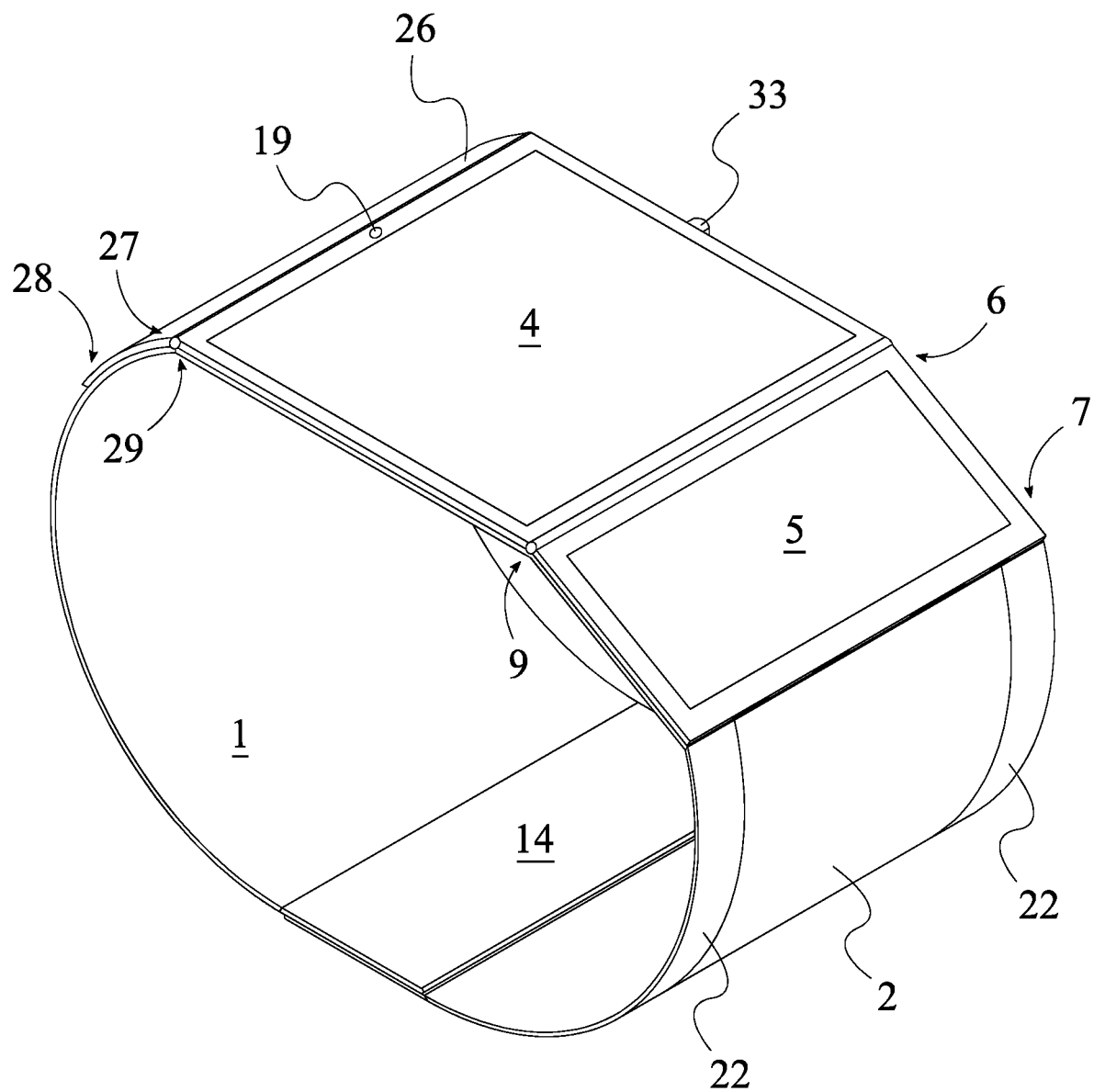
FIG. 1 is a front-left perspective view of the present invention.
Figure 8:
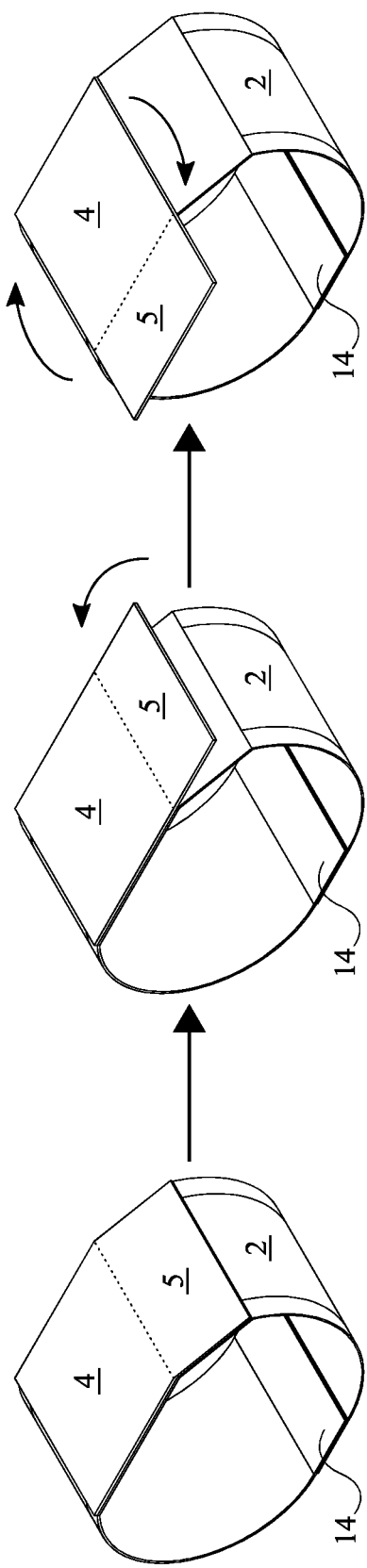
FIG. 8 is a schematic diagram representing the swiveling motion of the present invention.

The present invention is a wearable smart device that is used to enable a user to access the internet and applications with associated user accounts through cellular data or Wi-Fi. The present invention is configured to provide position- and orientation-adjustable touchscreens, which may be flexible or rigid and may be of a variety of different screen compositions. The present invention comprises a wristband 1, a primary touchscreen 4, a secondary touchscreen 5, a swiveling mechanism 8, a first ratcheting mechanism 9, and a controller 12, as shown in FIG. 1. The wristband 1 relates to a flexible polymeric strap that enables a user to connect the present invention to the user's body, especially around the user's wrist. The primary touchscreen 4 is a screen surface that provides the user with the ability to interact with the present invention through touch. The primary touchscreen 4 can be, but is not limited to, liquid crystal displays (LCD), organic light-emitting diodes (OLED), plastic light-emitting diode (POLED), micro-light-emitting diode (mLED), or a variety of other display technologies. The secondary touchscreen 5 is a screen surface that provides the user with the ability to interact with the present invention through touch. Similar to the primary touchscreen 4, the secondary touchscreen 5 may be any of LCDs, OLEDs, POLEDs, mLEDs, or a variety of other display technologies. The swiveling mechanism 8 is a bearing or other rotating member that enables the primary touchscreen 4 to rotate upon the wristband 1, as shown in FIG. 8. The first ratcheting mechanism 9 is a set of components that enables adjustment of the secondary touchscreen 5 relative to the primary touchscreen 4. The controller 12 is an electronic device which accepts electronic inputs from sensors, cameras, touchscreen inputs, and more and returns electrical output signals to appropriately connected components.

Figure 2:
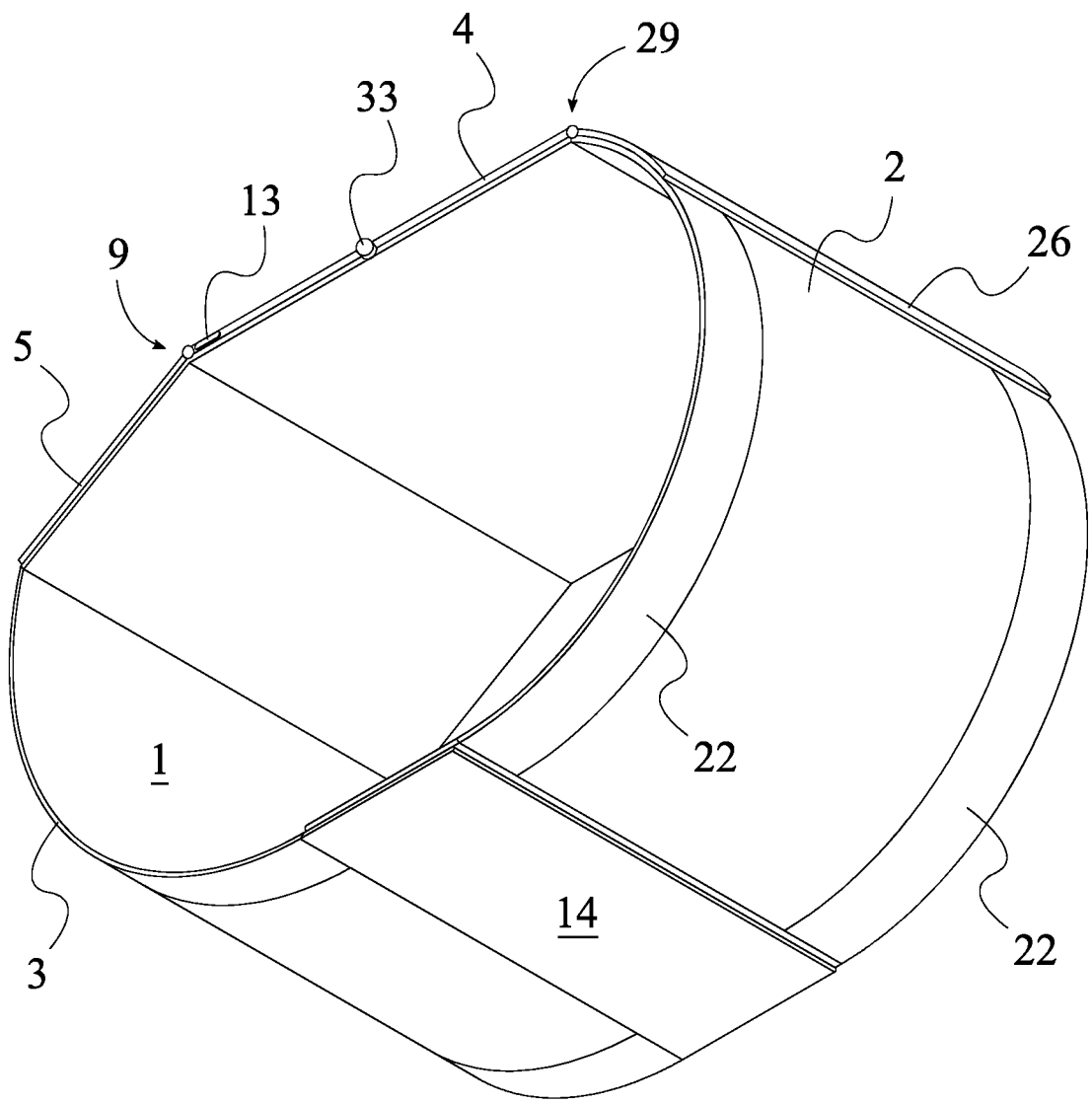
FIG. 2 is a bottom-right perspective view of the present invention.

The general configuration of the aforementioned components allows the present invention to efficiently and effectively communicate information and collect data according to the control of the user. The wristband 1 comprises an outer band surface 2, as shown in FIG. 2. The outer band surface 2 is the section of the wristband 1 which, in the preferred usage of the present invention, faces generally away from the user's wrist. The primary touchscreen 4 is rotatably mounted to the outer band surface 2 by the swiveling mechanism 8. Thus, the primary touchscreen 4 is capable of pivoting to provide the user with convenient and easily modifiable widescreen and portrait mode functionality. The secondary touchscreen 5 is peripherally positioned to the primary touchscreen 4. This relationship allows the primary touchscreen 4 to be in the user's line of sight and allows the secondary touchscreen 5 to be the periphery of the user's line of sight. The secondary touchscreen 5 is hingedly connected to the primary touchscreen 4 by the first ratcheting mechanism 9. In this way, the first ratcheting mechanism 9 is used to incrementally adjust the viewing angle of the secondary touchscreen 5 relative to the primary touchscreen 4. The controller 12 is positioned adjacent to the primary touchscreen 4. Thus, the controller 12 is optimally positioned for interaction with the primary touchscreen 4 and the secondary touchscreen 5. In an alternative embodiment, the controller 12 is positioned within the wristband 1, thus facilitating connection to components placed adjacent to the wristband 1. The controller 12 is electronically connected to the primary touchscreen 4 and the secondary touchscreen 5. This relationship allows for transferal of data, especially user inputs, amongst the primary touchscreen 4, the secondary touchscreen 5, and the controller 12.

In several embodiments of the present invention, the present invention benefits from a single connected monitor, thus improving the user experience. To this end, the primary touchscreen 4 and the secondary touchscreen 5 may be a continuous display panel, as shown in FIG. 8, wherein the hinged connection between the primary touchscreen 4 and the secondary touchscreen 5 is a fold in the continuous display panel. This arrangement provides the user with an aesthetically pleasing screen arrangement. Further, such an arrangement allows for enhanced functionality of the present invention, as a unified screen surface enables a smoother user experience.

In another embodiment of the present invention, the primary touchscreen 4 and the secondary touchscreen 5 are two discrete display panels, as shown in FIG. 1. In this embodiment, the primary touchscreen 4 and the secondary touchscreen 5 may operate independently or in unison to provide a unique user experience.

The primary touchscreen 4 may benefit from the ability to change shape, particularly as the user desires to customize their experience with the present invention. To this end, the primary touchscreen 4 may be a flexible display panel. Such technology enables modification of the display that is advantageous for the user. The flexible display panel further provides mechanical protection for the primary touchscreen 4, as the primary touchscreen 4 may thus receive mechanical support from the wristband 1.

Similarly, the secondary touchscreen 5 may be a flexible display panel. Thus, the secondary touchscreen 5 has not only the ability to conform to the user's wrist shape but further may expand to provide a seamless extension of the primary touchscreen 4. Furthermore, this arrangement enables winding or rolling of the secondary touchscreen 5 relative to the primary touchscreen 4, which allows the user to adjust the functional length of the combined screen area formed by the primary touchscreen 4 and the secondary touchscreen 5.

The secondary touchscreen 5 must be able to retain its position relative to the primary touchscreen 4 and must be able to release that position back into a resting position. To allow for the secondary touchscreen 5 to reset its position, the present invention further comprises a release actuator 13, as shown in FIG. 2. The release actuator 13 is any of a variety of buttons, switches, wheels, levers, or a variety of other mechanisms capable of incrementally adjusting the set angle between the primary touchscreen 4 and the secondary touchscreen 5. The release actuator 13 is operatively integrated into the first ratcheting mechanism 9, wherein the release actuator 13 is used to release the first ratcheting mechanism 9 from a currently-incremented angle between the primary touchscreen 4 and the secondary touchscreen 5 to a rest angle between the primary touchscreen 4 and the secondary touchscreen 5. The currently-incremented angle may be any angle between the primary touchscreen 4 and the secondary touchscreen 5 that positions the secondary touchscreen 5 offset from the wristband 1. The rest angle is an angle between the primary touchscreen 4 and the secondary touchscreen 5 that positions the secondary touchscreen 5 against the wristband 1. This arrangement enables the user to utilize the release actuator 13 to release the first ratcheting mechanism 9 and allow the secondary touchscreen 5 to shift from an elevated position into a resting position.

Figure 3:
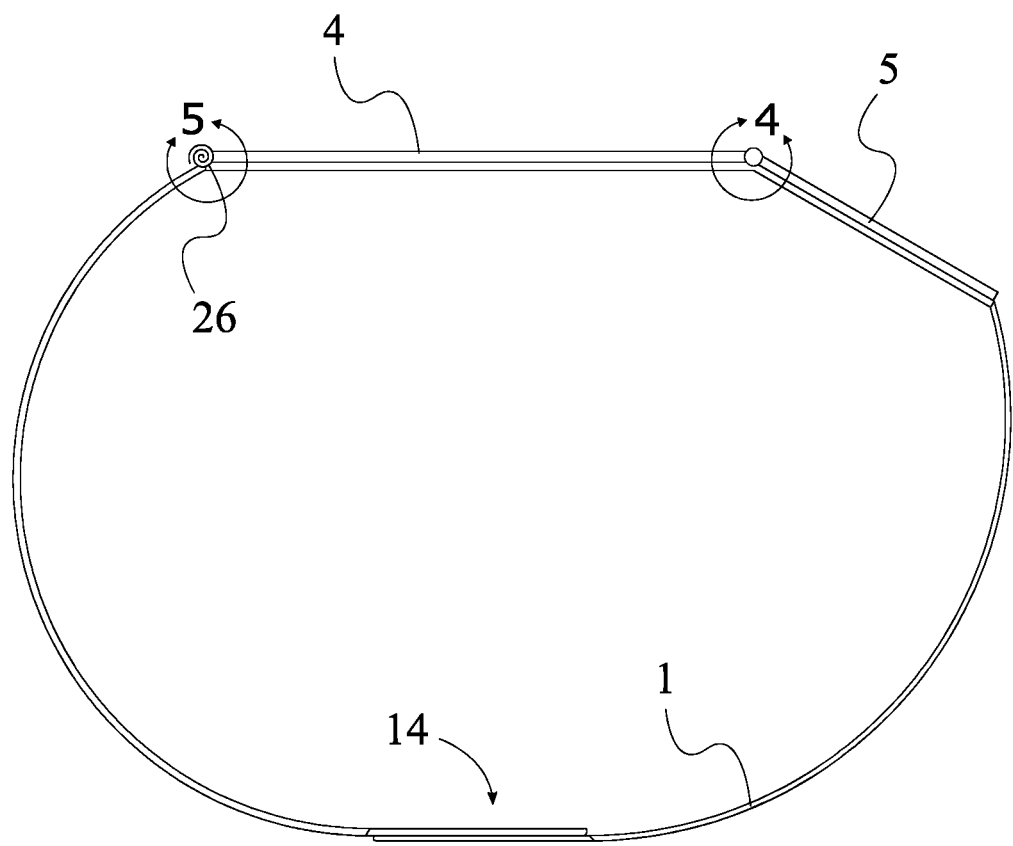
FIG. 3 is a side view of the present invention.

The wristband 1, in several embodiments, requires a connector that enables the user to attach or remove the wristband 1 from the user's wrist. To achieve this, the present invention comprises a band clasp 14, as shown in FIG. 3. The band clasp 14 is a connection mechanism that enables adjustment, securing, and release of the inner diameter of the wristband 1, thus allowing the user to fit the wristband 1 comfortably upon the user's wrist and release the wristband 1 at will. The band clasp 14 is positioned opposite to the primary touchscreen 4 about the wristband 1. This arrangement enables the user to hide the band clasp 14 during use, if desired, as the band clasp 14 would generally face in towards the user's body. The band clasp 14 is operatively integrated into the wristband 1, wherein the band clasp 14 is used to circumferentially adjust the wristband 1. Thus, the user is able to modify the band clasp 14, and thus the size of the wristband 1, to fit differently-sized users' wrists.

Figure 4:
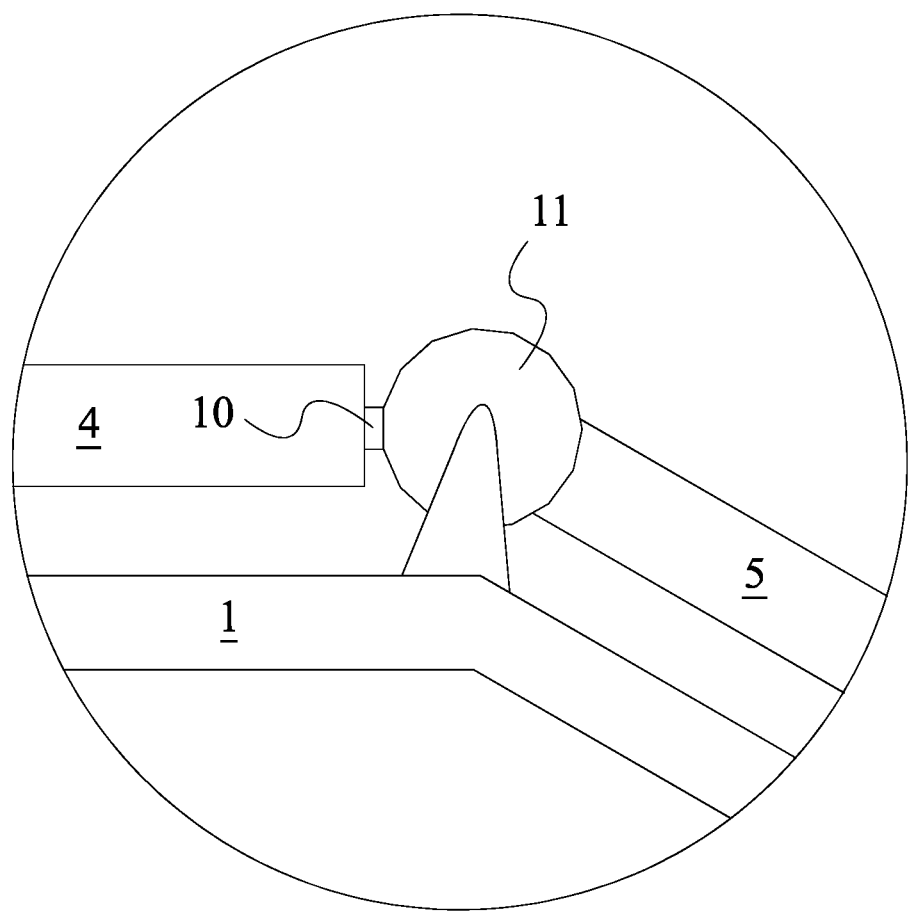
FIG. 4 is a detailed view taken about circle 4 in FIG. 3.

The present invention further benefits from the ability of the secondary touchscreen 5 to incrementally adjust its position relative to the primary touchscreen 4. This is advantageous in any configuration of screen types for the primary touchscreen 4 and the secondary touchscreen 5, including rigid or flexible configurations and including the embodiment in which the primary touchscreen 4 is one continuous display panel. To achieve the desired relationship, the first ratcheting mechanism 9 comprises a magnetic pawl 10 and a magnetic ratchet wheel 11, as shown in FIG. 4. The magnetic pawl 10 is a rigid component that restricts the magnetic ratchet wheel 11 to an incremental motion by magnetically or physically engaging with the magnetic ratchet wheel 11. The magnetic ratchet wheel 11 is an extended segment that allows for the rotational motion with the hinged connection between the primary touchscreen 4 and the secondary touchscreen 5. The magnetic pawl 10 is peripherally mounted to the primary touchscreen 4. Thus, the primary touchscreen 4 is adequately equipped to manage the magnetic ratchet wheel 11 through the magnetic pawl 10. The magnetic ratchet wheel 11 is peripherally mounted to the secondary touchscreen 5. In this way, the magnetic ratchet wheel 11 provides the secondary touchscreen 5 with the ability to interact appropriately with the magnetic pawl 10. The magnetic pawl 10 is magnetically engaged to the magnetic ratchet wheel 11. Thus, proximity or physical contact with the magnetic pawl 10 prevents free rotation of the magnetic ratchet wheel 11, thereby effectively locking the secondary touchscreen 5 into position relative to the primary touchscreen 4. However, the magnetic pawl 10 alternates between engaging and disengaged with the magnetic ratchet wheel 11, which allows for incremental rotation by the magnetic ratchet wheel 11.

In an exemplary embodiment, the magnetic ratchet wheel 11 is shaped to provide a notchy transition between different preset positions. To this end, a transversal cross-section of the magnetic ratchet wheel 11 is a regular polygon, as shown in FIG. 4. In this way, the magnetic ratchet wheel 11 provides intuitive suggested positions, thus improving the user experience of adjusting the position of the secondary touchscreen 5.

The first ratcheting mechanism 9 further benefits from the ability to allow the secondary touchscreen 5 to snap back into its resting position against the wristband 1. To achieve this, the release actuator 13 is a spring-loaded actuator. The magnetic pawl 10 is operatively coupled to the primary touchscreen 4 by the spring-loaded actuator, wherein the spring-loaded actuator is used to physically disengage the magnetic pawl 10 from the magnetic ratchet wheel 11. By biasing the magnetic ratchet wheel 11, utilization of the spring-loaded actuator to release the magnetic pawl 10 results in the magnetic ratchet wheel 11 rotating back into position against the wristband 1.

Figure 6:
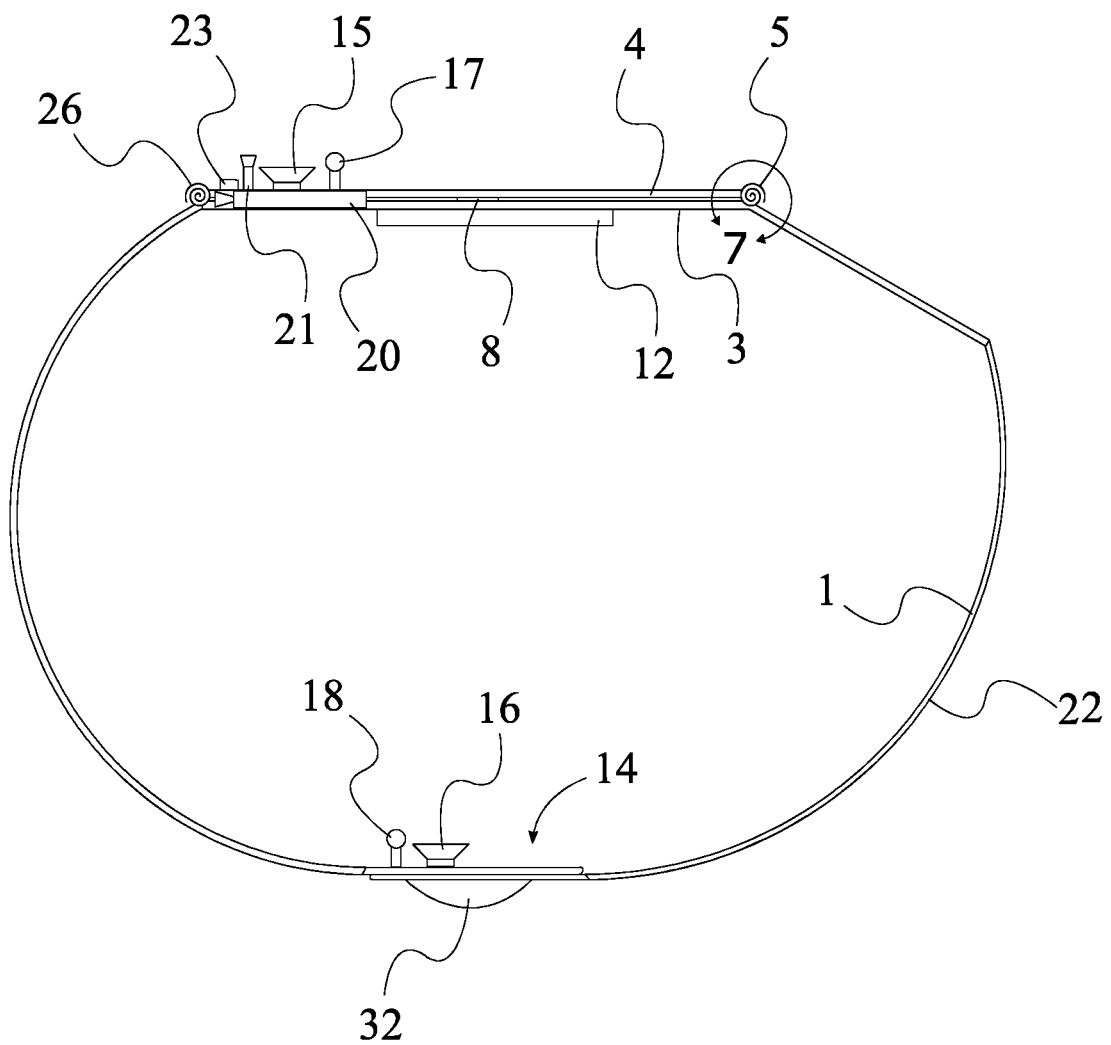
FIG. 6 is a schematic diagram representing the arrangement of the electronic components of the present invention.
Figure 9:
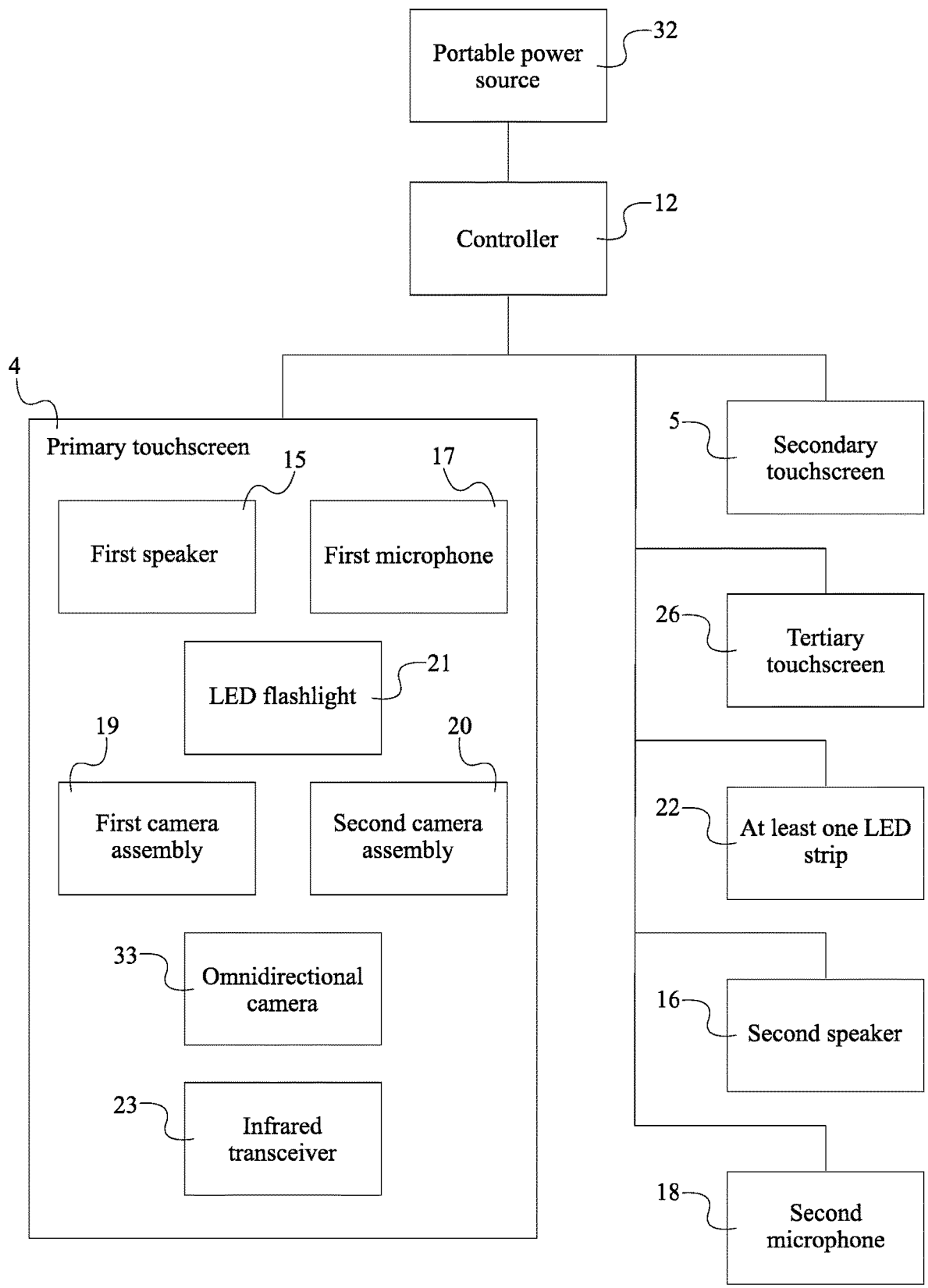
FIG. 9 is a block diagram representing the electronic connections of the present invention.

The present invention utilizes many electronic devices to enhance the ability of the user to interact with the environment and other people. These devices include mechanisms with which the device may communicate audibly with the user. To this end, the present invention further comprises a first speaker 15, as represented in FIGS. 6 and 9. The first speaker 15 is an output which converts electrical signals into audio. The first speaker 15 is integrated into the primary touchscreen 4. Such an arrangement enables the first speaker 15 to project towards the user. The first speaker 15 is electronically connected to the controller 12. In this way, the first speaker 15 is provided with both the electrical signals and the electrical power necessary to operate.

The present invention further benefits from the utilization of auditory devices as a means of communicating with the user during calls, or when listening privately to messages. To achieve this, the present invention further comprises a second speaker 16, as represented in FIGS. 6 and 9. The second speaker 16, like the first speaker 15, is an output which converts electrical signals into audio. The wristband 1 comprises a hand-facing edge 3. The hand-facing edge 3 is the edge which, in the preferred usage of the present invention, is oriented towards the hand of the wrist upon which the wristband 1 is mounted. The second speaker 16 is integrated into the wristband 1. This arrangement allows the second speaker 16 to project along the wristband 1. The second speaker 16 is positioned opposite to the primary touchscreen 4 about the wristband 1. Thus, the second speaker 16 projects audio away from other people. The second speaker 16 is oriented towards the hand-facing edge 3. This arrangement allows the second speaker 16 to project towards the user's hand. The second speaker 16 is electronically connected to the controller 12. Thus, the second speaker 16 is provided with both the electrical signals and the electrical power necessary to operate. The arrangement of the second speaker 16 enables the user to amplify, reduce, direct, and otherwise control audio output from the second speaker 16 by cupping or changing the shape of the user's hand.

The present invention further benefits from the capability to receive audio data from the user's surroundings. To achieve this, the present invention further comprises a first microphone 17, as represented in FIGS. 6 and 9. The first microphone 17 is an audio detector that receives audio signals and converts that data into electrical signals. The first microphone 17 is integrated into the primary touchscreen 4. This arrangement allows the first microphone 17 to receive ambient noise surrounding the primary touchscreen 4. The first microphone 17 is electronically connected to the controller 12. This arrangement enables electrical signals generated by the first microphone 17 to be received by the controller 12.

The user of the present invention may wish to utilize the present invention for a private conversation. To address this need, the present invention further comprises a second microphone 18, as represented in FIGS. 6 and 9. The second microphone 18, like the first microphone 17, is an audio detector that receives audio signals and converts that data into electrical signals. The wristband 1 comprises a hand-facing edge 3. The hand-facing edge 3 is the edge of the wristband 1 closest to the hand of the wrist used to support the wristband 1. The second microphone 18 is integrated into the wristband 1. This allows the second microphone 18 to receive signals along the wristband 1. The second microphone 18 is positioned opposite to the primary touchscreen 4 about the wristband 1. In this way, the second microphone 18 is oriented to receive audio towards the user's body. The second microphone 18 is oriented towards the hand-facing edge 3. Thus, the second microphone 18 is prepared to hear audio data from the direction of the user's hand. The second microphone 18 is electronically connected to the controller 12. Thus, the second microphone 18 is able to provide signals to the controller 12 for subsequent processing and is provided with the electrical power necessary to operate. The arrangement of the second microphone 18 enables the user to amplify, reduce, direct, and otherwise control audio input to the second microphone 18 by cupping or changing the shape of the user's hand.

The user of the present invention may wish to visually document events or collect photo or video data regarding an event. To this end, the present invention further comprises a first camera assembly 19, as represented in FIGS. 6 and 9. The first camera assembly 19 relates to a visual recording device capable of capturing visual data. The first camera assembly 19 is integrated into the primary touchscreen 4. This arrangement allows the primary touchscreen 4 to determine the direction in which the first camera assembly 19 faces. Further, the first camera assembly 19 is preferably positioned flush to the primary touchscreen 4, thus preventing damage that may occur to a protruding camera. The first camera assembly 19 is radially oriented away from the outer band surface 2. In this way, the first camera assembly 19 may be arranged so as to face picture or video targets. The first camera assembly 19 is electronically connected to the controller 12. This arrangement provides the first camera assembly 19 with the power required for functioning and further provides the controller 12 with the electrical signals representing the recorded visual data.

The present invention further benefits from the inclusion of an additional camera for simultaneous picture-taking and for high-quality imaging. Such technology would allow the user to create a joint photo or video that includes both the user and the user's target. Further, many users of smart technologies can become distracted during use, leading to incidents that can be hazardous to their physical well-being. To address these issues, the present invention further comprises a second camera assembly 20, as represented in FIGS. 6 and 9. The second camera assembly 20 relates to a telescopic set of lenses and sensors positioned along the primary touchscreen 4 that allow for high quality zoom and focus. Furthermore, the wristband 1 comprises a hand-facing edge 3. The second camera assembly 20 is integrated in between the primary touchscreen 4 and the outer band surface 2. This arrangement allows the user to easily adjust the orientation of the second camera assembly 20. Alternatively, the second camera assembly 20 may be integrated within the primary touchscreen 4. The second camera assembly 20 is oriented parallel to the hand-facing edge 3. Thus, the user may aim the camera by adjusting the position of the user's wrist. The second camera assembly 20 is electronically connected to the controller 12. This arrangement provides the second camera assembly 20 with the power required for functioning and further provides the controller 12 with the electrical signals representing the recorded visual data.

The user may have a need to utilize the present invention at night, or otherwise in the dark, in order to navigate or locate items or people. To achieve this goal, the present invention further comprises at least one light-emitting diode (LED) flashlight 21, as represented in FIGS. 6 and 9. The at least one LED flashlight 21 is an illumination source that allows the user to brighten a dark room or area. The at least one LED flashlight 21 is integrated into the primary touchscreen 4. Such positioning allows the user to control the direction of light from the at least one LED flashlight 21 in a desired direction. The at least one LED flashlight 21 is electronically connected to the controller 12. This arrangement provides electrical power and activation signals from the controller 12 to the at least one LED flashlight 21. The at least one LED flashlight 21 may further be utilized in conjunction with the first camera assembly 19 and the second camera assembly 20 as a mechanism for providing external light or a flash before taking a picture.

The present invention requires a mechanism by which the user and others may locate or identify the present invention. To this end, the present invention further comprises at least one LED strip 22, as represented in FIGS. 6 and 9. The at least one LED strip 22 relates to a row of electronically connected lights or light sources that illuminate in a coordinated fashion to illuminate the present invention. The at least one LED strip 22 is connected around the wristband 1. This arrangement allows the at least one LED strip 22 to illuminate at least one edge of the wristband 1. The at least one LED strip 22 is electronically connected to the controller 12. This arrangement allows the at least one LED strip 22 to receive and respond to signals from the controller 12 regarding appropriate function.

Many smart devices are capable of connecting to household devices through Wi-Fi or local mechanisms, but are unable to control infrared-based technologies, such as televisions, directly. To achieve this end, the present invention further comprises an infrared transceiver 23, as represented in FIGS. 6 and 9. The infrared transceiver 23 is a combined electrical sensor and transmitter that collects and responds to data from infrared sources, particularly televisions. The infrared transceiver 23 is integrated into the primary touchscreen 4. This arrangement allows the user to direct the infrared transceiver 23 by adjusting the position of the primary touchscreen 4. The infrared transceiver 23 is electronically connected to the controller 12. This arrangement allows the controller 12 to send electrical power to the infrared transceiver 23 and for the infrared transceiver 23 to relay captured data back to the controller 12.

Figure 7:
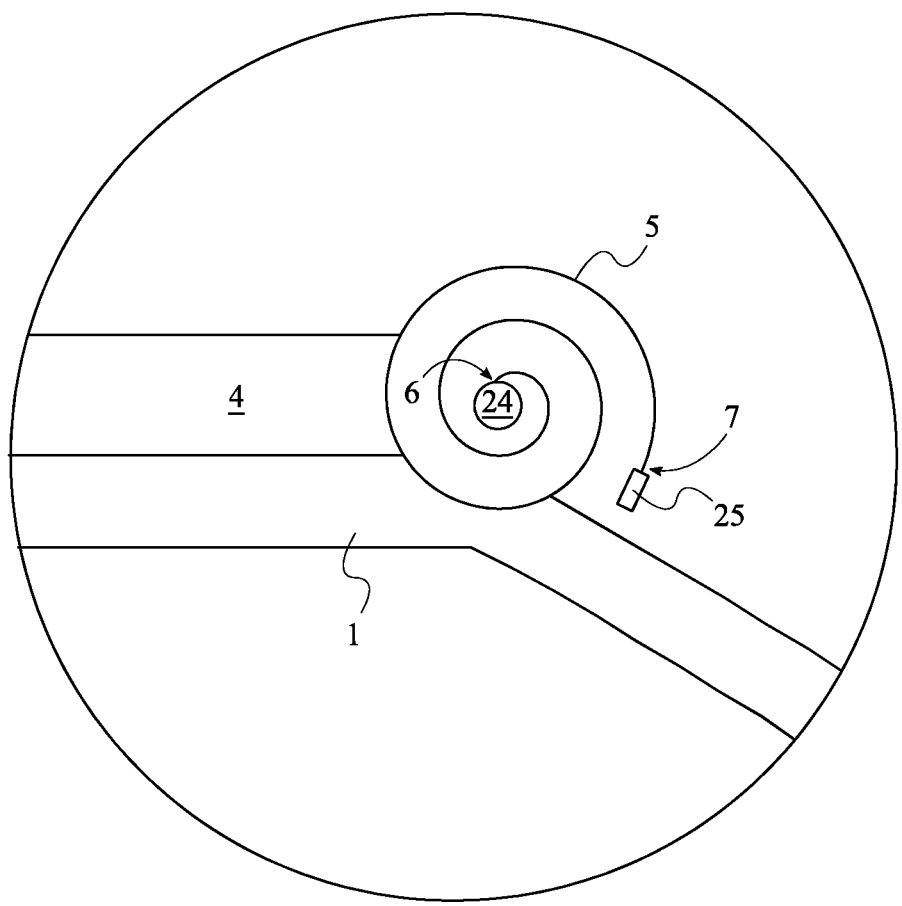
FIG. 7 is a detailed view taken about circle 7 in FIG. 6.

The present invention employs further mechanisms by which to improve the user's experience. Among these is the ability for the display to roll out to a desired length. To provide this capability, the present invention further comprises a first spindle 24 and a first pullout feature 25, as represented in FIG. 7. The first spindle 24 is a rotatably mounted rod about which connected items may wind or unwind. The first pullout feature 25 relates to a tab, notch, or other gripping mechanism by which the user may grasp the object to be wound. The secondary touchscreen 5 is preferably a rollable display panel. Such an arrangement allows the secondary touchscreen 5 to change shape according to the wishes of the user. The secondary touchscreen 5 comprises a fixed edge 6 and a free edge 7. The fixed edge 6 is a section of the secondary touchscreen 5 that enables connection to the first spindle 24. The free edge 7 is the edge that defines the length of useable screen surface. The first spindle 24 is rotatably mounted along the first ratcheting mechanism 9. In this way, the first spindle 24 is able to rotate in order to wind or unwind the connected screen. The fixed edge 6 and the free edge 7 are positioned opposite to each other across the secondary touchscreen 5. This arrangement allows the free edge 7 to protrude to provide an adjustable-length screen surface. The fixed edge 6 is connected along the first spindle 24. Thus, the fixed edge 6 of the secondary touchscreen 5 winds or unwinds around the first spindle 24 to effectively hide a portion of the secondary touchscreen 5. The first pullout feature 25 is integrated into the free edge 7. In this way, the free edge 7 may be pulled by the first pullout feature 25 in order to extend the effective size of the primary touchscreen 4.

The user may desire to present or display messages to other individuals without adjusting the user's wrist or arm. To allow for this, the present invention further comprises a tertiary touchscreen 26 and a second ratcheting mechanism 29, as represented in FIGS. 1 and 2. The tertiary touchscreen 26 is an interactive, touch-sensitive surface capable of presenting information and visual displays and receiving user inputs. The tertiary touchscreen 26 may be utilized for complex operations, including recording user inputs from multiple parties, or may be utilized for the simple display of friendly greetings. The second ratcheting mechanism 29 is a set of components that combine to allow for incremental adjustment of the angle between the tertiary touchscreen 26 and the primary touchscreen 4. The tertiary touchscreen 26 is peripherally positioned to the primary touchscreen 4, opposite to the secondary touchscreen 5. This arrangement allows the user to display information away from user's body, preferably towards other individuals. The tertiary touchscreen 26 is hingedly connected to the primary touchscreen 4 by the second ratcheting mechanism 29. This arrangement enables the second ratcheting mechanism 29 to incrementally adjust the position of the tertiary touchscreen 26 relative to the primary touchscreen 4. The controller 12 is electronically connected to the tertiary touchscreen 26. Thus, the controller 12 may provide electrical power to the tertiary touchscreen 26 and receive electrical inputs from the tertiary touchscreen 26.

Figure 5:
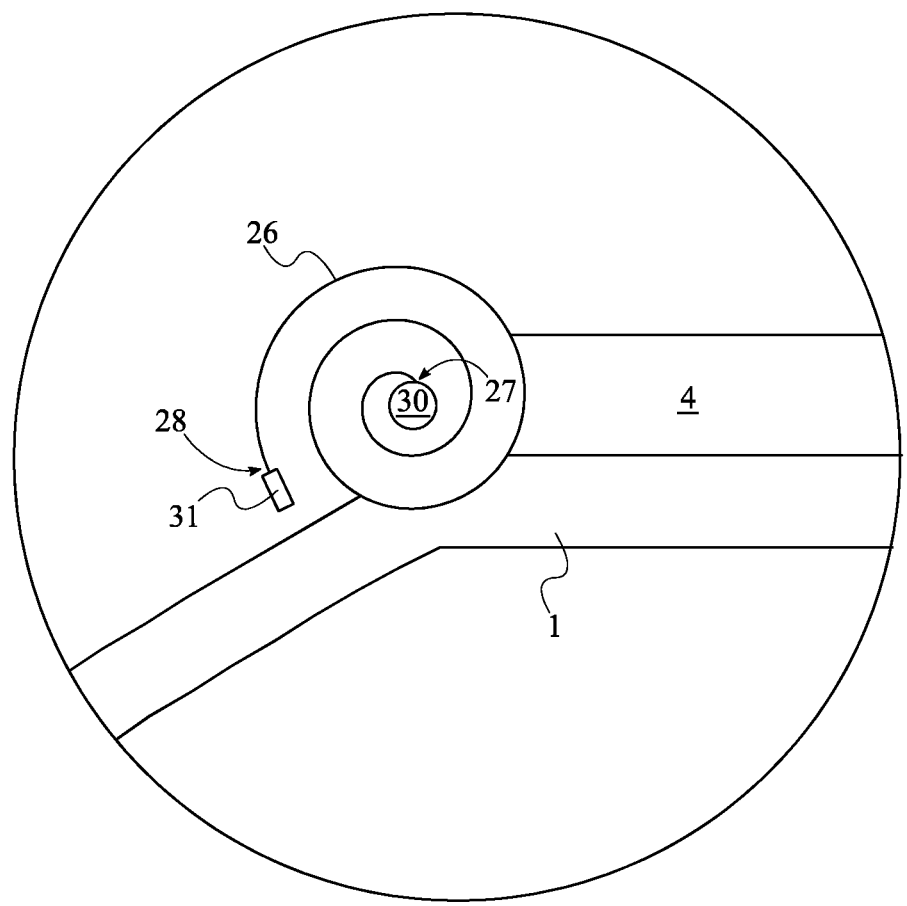
FIG. 5 is a detailed view taken about circle 5 in FIG. 3.

The second ratcheting mechanism 29 may be arranged to provide the tertiary touchscreen 26 at varying display sizes relative to the primary touchscreen 4. To enable rollability of the tertiary touchscreen 26, the present invention further comprises a second spindle 30 and a second pullout feature 31, as represented in FIG. 5. The tertiary touchscreen 26 may also be a rollable display panel, thus enabling the tertiary touchscreen 26 to change shape and position in response to the user's influence. The tertiary touchscreen 26 comprises a fixed edge 27 and a free edge 28. The fixed edge 27 is a section of the tertiary touchscreen 26 that enables connection to the second spindle 30. The free edge 28 is the edge that defines the length of useable screen surface. The second spindle 30 is rotatably mounted along the second ratcheting mechanism 29. This arrangement allows rotation of the second spindle 30 on the second ratcheting mechanism 29. The fixed edge 27 and the free edge 28 are positioned opposite to each other across the tertiary touchscreen 26. In this way, the free edge 28 is able to define the display area of the tertiary touchscreen 26. The fixed edge 27 is connected along the second spindle 30. Thus, the fixed edge 27 provides the connection necessary to allow for winding or unwinding of the tertiary touchscreen 26 about the second spindle 30. The second pullout feature 31 is integrated into the free edge 28. Thus, the user may grasp the second pullout feature 31 in order to adjust the operative length of the tertiary touchscreen 26.

The present invention must include a mechanism for providing the controller 12 with electrical power. To this end, the present invention further comprises a portable power source 32, as represented in FIGS. 6 and 9. The portable power source 32 is any of a variety of batteries or other electrical power storage devices capable of providing and regulating electrical power throughout the present invention. The portable power source 32 may utilize rechargeable batteries, plugs, cords, wireless charging technology, or a variety of other mechanisms to provide electrical power. The portable power source 32 is integrated into the wristband 1. This arrangement enables the portable power source 32 to provide power to various components throughout the wristband 1. The portable power source 32 is positioned opposite to the primary touchscreen 4 about the wristband 1. In this way, the portable power source 32 is positioned out of the way of physically-engaging activity of the present invention, thus reducing susceptibility to accidental damage during use. Further, such positioning avoids problems that can arise from proximity of the portable power source 32 to the primary touchscreen 4. Increased separation results in performance improvements due to moderating the heat flow and preventing heat from building on the portable power source 32 or the primary touchscreen 4. Furthermore, the position of the portable power source 32 allows the portable power source 32 to consume space without interfering with the function or appearance of the primary touchscreen 4. The portable power source 32 is electrically connected to the primary touchscreen 4, the secondary touchscreen 5, and the controller 12. This arrangement provides electrical power to each component, including various sensors and sub-devices connected through the controller 12.

Many users of the present invention may desire to capture their full environment in a single picture. To address this issue, the present invention further comprises an omnidirectional camera 33, as represented in FIGS. 6 and 9. The omnidirectional camera 33 relates to a camera positioned in order to capture a full image of the surrounding area. Furthermore, the wristband 1 comprises a hand-facing edge 3. The omnidirectional camera 33 is mounted onto the wristband 1. This arrangement enables the omnidirectional camera 33 to extend without disturbing regular usage of the present invention. The omnidirectional camera 33 is oriented towards the hand-facing edge 3. Thus, the omnidirectional camera 33 is positioned to record the user's surroundings for subsequent processing. The controller 12 is electronically connected to the omnidirectional camera 33. Thus, signals generated from the omnidirectional camera 33 are relayed to the controller 12 for analysis and response. The omnidirectional camera 33 may include a camera sensor wrapped in a cylindrical configuration around a single sensor in the lens chamber.

Although the invention has been explained in relation to its preferred embodiment, it is to be understood that many other possible modifications and variations can be made without departing from the spirit and scope of the invention as hereinafter claimed.

What is claimed is:

1. A wearable smart device comprises:
    a wristband;
    a primary touchscreen;
    a secondary touchscreen;
    a swiveling mechanism;
    a first ratcheting mechanism;
    a controller;
    the wristband comprises an outer band surface;
    the primary touchscreen being rotatably mounted to the outer band surface by the swiveling mechanism;
    the secondary touchscreen being peripherally positioned to the primary touchscreen;
    the secondary touchscreen being hingedly connected to the primary touchscreen by the first ratcheting mechanism;
    the controller being positioned adjacent to the primary touchscreen;
    the controller being electronically connected to the primary touchscreen and the secondary touchscreen;
    the first ratcheting mechanism comprises a magnetic pawl and a magnetic ratchet wheel;
    the magnetic pawl being peripherally mounted to the primary touchscreen;
    the magnetic ratchet wheel being peripherally mounted to the secondary touchscreen; and
    the magnetic pawl being magnetically engaged to the magnetic ratchet wheel.

2. The wearable smart device as claimed in claim 1, wherein the primary touchscreen and the secondary touchscreen are a continuous display panel, and wherein the hinged connection between the primary touchscreen and the secondary touchscreen is a fold in the continuous display panel.

3. The wearable smart device as claimed in claim 1, wherein the primary touchscreen and the secondary touchscreen are two discrete display panels.

4. The wearable smart device as claimed in claim 1, wherein the primary touchscreen is a flexible display panel.

5. The wearable smart device as claimed in claim 1, wherein the secondary touchscreen is a flexible display panel.

6. The wearable smart device as claimed in claim 1 comprises:
    a release actuator; and
    the release actuator being operatively integrated into the first ratcheting mechanism, wherein the release actuator is used to release the first ratcheting mechanism from a currently-incremented angle between the primary touchscreen and the secondary touchscreen to a rest angle between the primary touchscreen and the secondary touchscreen.

7. The wearable smart device as claimed in claim 1 comprises:
a band clasp;
the band clasp being positioned opposite to the primary touchscreen about the wristband; and
the band clasp being operatively integrated into the wristband, wherein the band clasp is used to circumferentially adjust the wristband.

8. The wearable smart device as claimed in claim 1, wherein a transversal cross-section of the magnetic ratchet wheel is a regular polygon.

9. The wearable smart device as claimed in claim 1 comprises:
a release actuator;
the release actuator being a spring-loaded actuator; and
the magnetic pawl being operatively coupled to the primary touchscreen by the spring-loaded actuator, wherein the spring-loaded actuator is used to physically disengage the magnetic pawl from the magnetic ratchet wheel.

10. The wearable smart device as claimed in claim 1 comprises:
a first speaker;
the first speaker being integrated into the primary touchscreen; and
the first speaker being electronically connected to the controller.

11. The wearable smart device as claimed in claim 10 comprises:
a second speaker;
the wristband comprises a hand-facing edge;
the second speaker being integrated into the wristband;
the second speaker being positioned opposite to the primary touchscreen about the wristband;
the second speaker being oriented towards the hand-facing edge; and
the second speaker being electronically connected to the controller.

12. The wearable smart device as claimed in claim 1 comprises:
a first microphone;
the first microphone being integrated into the primary touchscreen; and
the first microphone being electronically connected to the controller.

13. The wearable smart device as claimed in claim 12 comprises:
a second microphone;
the wristband comprises a hand-facing edge;
the second microphone being integrated into the wristband;
the second microphone being positioned opposite to the primary touchscreen about the wristband;
the second microphone being oriented towards the hand-facing edge; and
the second microphone being electronically connected to the controller.

14. The wearable smart device as claimed in claim 1 comprises:
a first camera assembly;
the first camera assembly being integrated into the primary touchscreen;
the first camera assembly being radially oriented away from the outer band surface; and
the first camera assembly being electronically connected to the controller.

15. The wearable smart device as claimed in claim 14 comprises:
a second camera assembly;
the wristband comprises a hand-facing edge;
the second camera assembly being integrated in between the primary touchscreen and the outer band surface;
the second camera assembly being oriented parallel to the hand-facing edge; and
the second camera assembly being electronically connected to the controller.

16. The wearable smart device as claimed in claim 1 comprises:
a light-emitting diode (LED) flashlight;
the LED flashlight being integrated into the primary touchscreen; and
the LED flashlight being electronically connected to the controller.

17. The wearable smart device as claimed in claim 1 comprises:
at least one LED strip;
the at least one LED strip being connected around the wristband; and
the at least one LED strip being electronically connected to the controller.

18. The wearable smart device as claimed in claim 1 comprises:
an infrared transceiver;
the infrared transceiver being integrated into the primary touchscreen; and
the infrared transceiver being electronically connected to the controller.

19. The wearable smart device as claimed in claim 1 comprises:
a first spindle;
a first pullout feature;
the secondary touchscreen being a rollable display panel;
the secondary touchscreen comprises a fixed edge and a free edge;
the first spindle being rotatably mounted along the first ratcheting mechanism;
the fixed edge and the free edge being positioned opposite to each other across the secondary touchscreen;
the fixed edge being connected along the first spindle; and
the first pullout feature being integrated into the free edge.

20. The wearable smart device as claimed in claim 19 comprises:
a tertiary touchscreen;
a second ratcheting mechanism;
the tertiary touchscreen being peripherally positioned to the primary touchscreen, opposite to the secondary touchscreen;
the tertiary touchscreen being hingedly connected to the primary touchscreen by the second ratcheting mechanism; and
the controller being electronically connected to the tertiary touchscreen.

21. The wearable smart device as claimed in claim 20 comprises:
a second spindle;
a second pullout feature;
the tertiary touchscreen being a rollable display panel;
the tertiary touchscreen comprises a fixed edge and a free edge;
the second spindle being rotatably mounted along the second ratcheting mechanism;
the fixed edge and the free edge being positioned opposite to each other across the tertiary touchscreen;

the fixed edge being connected along the second spindle; and the second pullout feature being integrated into the free edge.

22. The wearable smart device as claimed in claim 1 comprises:
   a portable power source;
   the portable power source being integrated into the wristband;
   the portable power source being positioned opposite to the primary touchscreen about the wristband; and
   the portable power source being electrically connected to the primary touchscreen, the secondary touchscreen, and the controller.

23. The wearable smart device as claimed in claim 1 comprises:
   an omnidirectional camera;
   the wristband comprises a hand-facing edge;
   the omnidirectional camera being mounted onto the wristband;
   the omnidirectional camera being oriented towards the hand-facing edge; and
   the controller being electronically connected to the omnidirectional camera.

* * * * *